(12) United States Patent
Gale et al.

(10) Patent No.: US 7,681,558 B2
(45) Date of Patent: Mar. 23, 2010

(54) SYSTEM AND METHOD TO CONTROL FUEL VAPORIZATION

(75) Inventors: Allan Roy Gale, Livonia, MI (US); Joseph Norman Ulrey, Dearborn, MI (US); Larry Dean Elie, Ypsilanti, MI (US); Paul Raymund Nicastri, Plymouth, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/014,312

(22) Filed: Jan. 15, 2008

(65) Prior Publication Data

US 2009/0178651 A1 Jul. 16, 2009

(51) Int. Cl.
F02G 5/00 (2006.01)
(52) U.S. Cl. .................. 123/557; 123/549; 123/490; 239/135
(58) Field of Classification Search .......... 123/549, 123/557, 490; 239/135
See application file for complete search history.

(56) References Cited

U.S. PATENT DOCUMENTS

| | | | |
|---|---|---|---|
| 3,566,151 A | 2/1971 | Wilburn | |
| 4,588,274 A | 5/1986 | Kazumi | |
| 4,709,233 A | 11/1987 | Duval | |
| 4,818,842 A * | 4/1989 | Walty | 219/205 |
| 5,887,799 A * | 3/1999 | Smith | 239/585.1 |
| 6,039,014 A | 3/2000 | Hoppie | |
| 6,109,247 A | 8/2000 | Hunt | |
| 6,109,543 A * | 8/2000 | Bright et al. | 239/135 |
| 6,176,226 B1 * | 1/2001 | Nines et al. | 123/549 |
| 6,332,457 B1 * | 12/2001 | Imoehl | 123/549 |
| 6,575,126 B2 * | 6/2003 | Sturman | 123/90.11 |
| 6,696,675 B2 * | 2/2004 | Morrison | 219/661 |
| 2003/0015597 A1 * | 1/2003 | Nines et al. | 239/13 |
| 2004/0112341 A1 | 6/2004 | Mashimo et al. | |
| 2007/0235557 A1 * | 10/2007 | Hornby et al. | 239/135 |
| 2008/0060619 A1 * | 3/2008 | Allston et al. | 123/549 |

OTHER PUBLICATIONS

U.S. Appl. No. 11/566,890, filed Dec. 5, 2006, Wineland et al.
U.S. Appl. No. 11/566,932, filed Dec. 5, 2006, Stephan et al.
U.S. Appl. No. 11/566,911, filed Dec. 5, 2006, Gale et al.
U.S. Appl. No. 11/566,981, filed Dec. 5, 2006, Maranville et al.
U.S. Appl. No. 11/566,966, filed Dec. 5, 2006, Gale et al.

* cited by examiner

*Primary Examiner*—Stephen K Cronin
*Assistant Examiner*—Anthony L Bacon
(74) *Attorney, Agent, or Firm*—Allan J. Lippa; Alleman Hall McCoy Russell & Tuttle LLP (57) ABSTRACT

A method for improving fuel heating is presented. The method can reduce system complexity and cost when fuel is heated within a fuel injector. In one embodiment, the method independently heats and injects fuel by changing the direction of current flow through a fuel circuit.

18 Claims, 6 Drawing Sheets

SYSTEM AND METHOD TO CONTROL FUEL VAPORIZATION

FIELD

The present description relates to a system and method for heating fuel and controlling fuel injection of a fuel injector that operates as part of an internal combustion engine.

BACKGROUND

Fuel vaporization tends to decrease as ambient temperature decreases. This can make engine starting more difficult at lower temperatures because reduced fuel vaporization can result in an air-fuel mixture near the engine's spark plug that is less than the fuel's lower flammability limit. Further, lower rates of fuel vaporization may make engine starting particularly difficult for certain types of fuels (e.g., ethanol). One example way to improve fuel vaporization is described in U.S. Patent Application 2005/0263136. This patent application describes placing a heating coil around the nozzle of a port fuel injector. The heating coil is supplied electrical energy through an electrical connector that attaches to an engine wiring harness. Heat produced by the heating coil is conducted through the injector to heat fuel that resides within the injector. This heating apparatus purportedly improves fuel vaporization.

The above-mentioned system can also have several disadvantages. Namely, the system heats the injector through conducting heat from a source outside the injector body. Since the heat source is external to the injector, some energy intended to heat the injector is lost to heating the engine and may therefore be less efficient than is desired. In addition, the heating device requires an additional electrical connector to route power to the heating device. An additional connector increases the number of wires and connections. Therefore, system reliability may be reduced when such a system is used to increase the temperature of fuel injected to an engine. In addition, the system may be difficult to implement on direct injection engine because there may be less space available to place a heating coil around the injector nozzle.

The inventors herein have recognized the above-mentioned disadvantages and have developed a method that offers substantial improvements.

SUMMARY

One embodiment of the present description includes a system to heat and inject fuel to an internal combustion engine, the system comprising: an internal combustion engine; a fuel injector capable of delivering fuel to said internal combustion engine, said fuel injector comprising a heating element and a fuel flow control element; and a controller that supplies current to said fuel injector in a first direction to heat fuel that flows through said fuel injector, and said controller supplying current to said fuel injector in a second direction to deliver fuel to said engine without substantially heating the fuel delivered through said fuel injector. This method overcomes at least some disadvantages of the above-mentioned method.

Fuel vaporization and system reliability can be improved by a system that heats fuel from within the fuel injector and that supplies fuel heating energy through the same conductors that are used to actuate the injector. In one embodiment, a system provides current in a first direction to heat fuel contained or passing through the fuel injector, and the system actuates the fuel injector by providing current in a second direction. In other words, the system controls injector heating and actuation (opening and/or closing) by controlling the direction that current is delivered to the fuel injector. This allows the system to use a single pair of wires to actuate the injector and heat fuel passing through the injector. Consequently, fewer conductors have to be provided, less electrical connections are made, and existing fuel injector connectors can be used to realize the system. Furthermore, the fuel heating and fuel injection elements can be integrated into a small package.

The present description can provide several advantages. Specifically, the approach can improve system reliability, reduce the cost of heating fuel, and it can be implemented with few changes to existing fuel systems. The system can also be used on a variety of injector designs. For example, the described system can be used to heat fuel flowing through port style injectors, injectors that inject fuel directly into a cylinder, injectors having a single coil controlled pintle, and injectors that use dual coil spool valve operated injectors.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
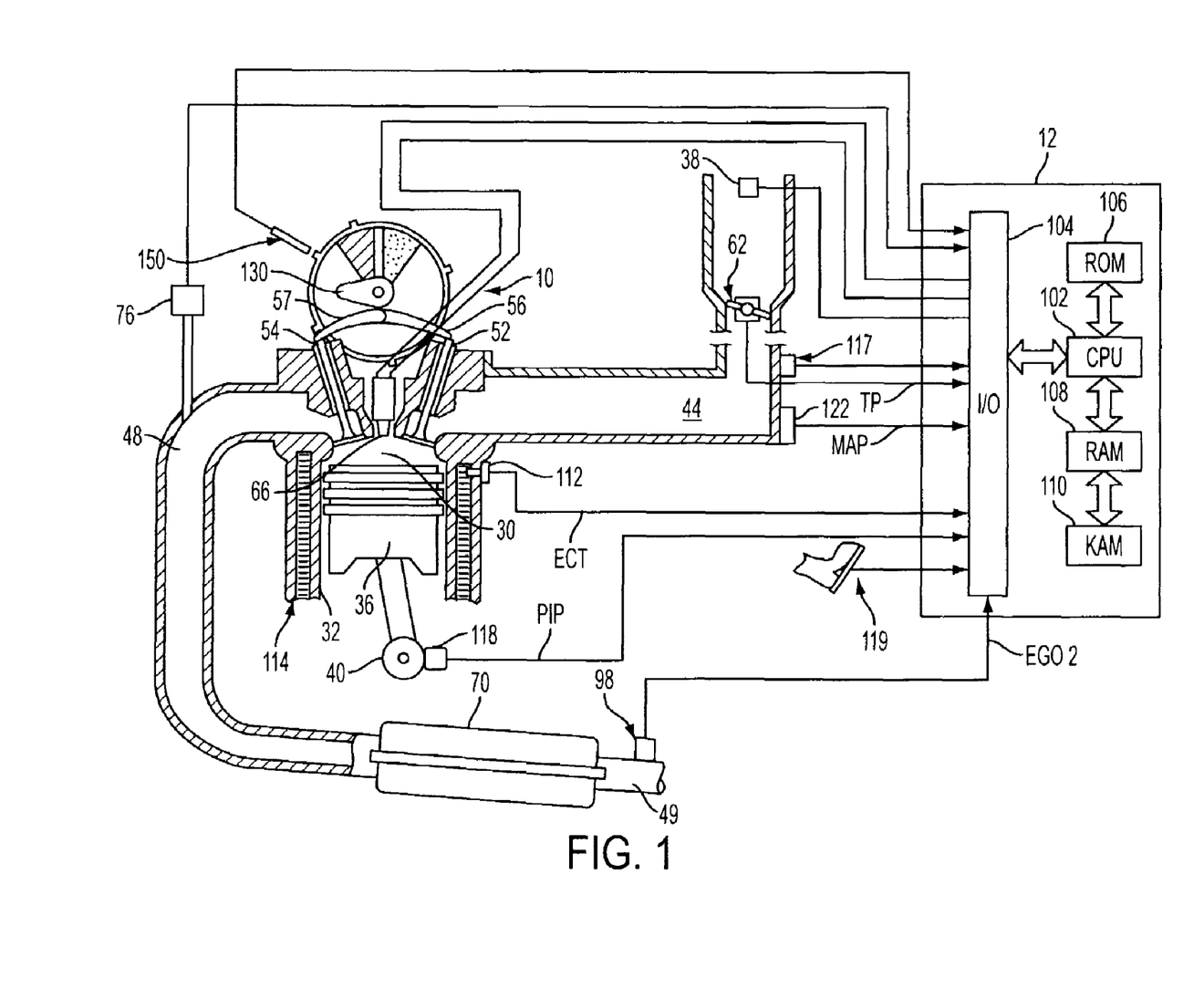
FIG. 1 is a schematic diagram of an engine configured to operate with heated fuel injectors.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 and exhaust valve 54. Intake manifold 44 is shown communicating with optional electronic throttle 62.

Fuel is directly injected into combustion chamber 30 via fuel injector 66. The fuel injector is an example of an electrically operable mechanical valve. Fuel injector 66 receives opening and closing signals from controller 12. Camshaft 130 is constructed with at least one intake cam lobe profile and at least one exhaust cam lobe profile. Alternatively, the intake cam may have more than one lobe profile that may have different lift amounts, different durations, and may be phased differently (i.e., the cam lobes may vary in size and in orientation with respect to one another). In yet another alternative, the system may utilize separate intake and exhaust cams. Cam position sensor 150 provides cam position information to controller 12. Intake valve rocker arm 56 and exhaust valve rocker arm 57 transfer valve opening force from camshaft 130 to the respective valve stems. Intake rocker arm 56 may include a lost motion member for selectively switching between lower and higher lift cam lobe profiles, if desired. Alternatively, different valvetrain actuators and designs may be used in place of the design shown (e.g., pushrod instead of over-head cam, electromechanical instead of hydro-mechanical).

Fuel is delivered to fuel injector 66 by a fuel system (not shown) including a fuel tank, fuel pump, and fuel rail (not shown). Engine 10 may be designed to operate on one or more non-limiting fuel types such as diesel, gasoline, alcohol, or propane.

A distributor-less ignition system (not shown) may provide ignition spark to combustion chamber 30 via a spark plug (not shown) in response to controller 12. Universal Exhaust Gas Oxygen (UEGO) sensor 76 is shown coupled to exhaust manifold 48 upstream of catalytic converter 70. Two-state exhaust gas oxygen sensor 98 is shown coupled to exhaust pipe 49 downstream of catalytic converter 70. Converter 70 may include multiple catalyst bricks, particulate filters, and/or exhaust gas trapping devices.

Controller 12 is shown in FIG. 1 as a conventional microcomputer including: microprocessor unit 102, input/output ports 104, read-only memory 106, random-access memory 108, keep-alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to an accelerator pedal; a measurement of engine manifold pressure (MAP) from pressure sensor 122 coupled to intake manifold 44; engine knock sensor (not shown); fuel type sensor (not shown); humidity from humidity sensor 38; a measurement (ACT) of engine air temperature or manifold temperature from temperature sensor 117; and an engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

Controller 12 storage medium read-only memory 106 can be programmed with computer readable data representing instructions executable by processor 102 for performing the methods described below as well as other variants that are anticipated but not specifically listed.

Figure 2:
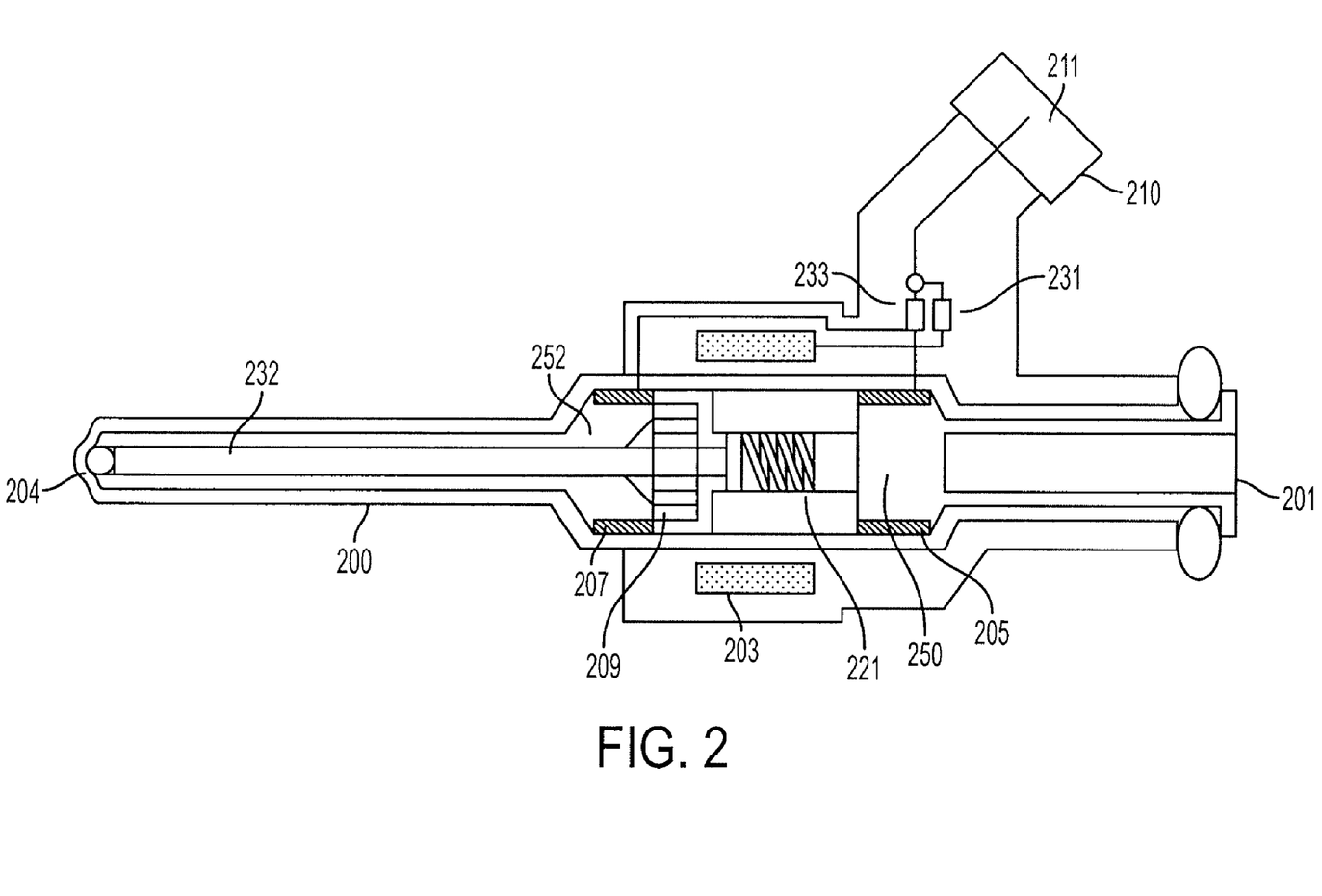
FIG. 2 is a flowchart of an example fuel injector.

Referring now to FIG. 2, a schematic of an example direct injection fuel injector is shown. Fuel injector 200 is designed to inject fuel directly into a cylinder of an internal combustion engine. However, the present description is not restricted to direct injectors or to injectors having the same design as the illustrated injector. For example, the present description may be utilized on port or central fuel injectors, or it may be used with fluid (e.g., oil) assisted intensifier injectors. FIG. 2 is not intended to limit the scope or breadth of the present description.

Returning to FIG. 2, fuel is fed to the injector through port 201. Pressurized liquid fuel occupies reservoirs 250 and 252 until injected to a cylinder. Needle valve 232 regulates the flow of fuel from the injector to the cylinder through nozzle 204. The needle valve position is controlled by flowing electrical current through coil 203. The electrical current passing through coil 203 induces a magnetic field around coil 203 that attracts armature 209 toward the coil. As armature 209 approaches coil 203, spring 221 is compressed, and needle valve 232 lifts from the injector nozzle seat. Fuel then flows to the cylinder.

Fuel in reservoirs 250 and 252 can be heated by passing current through positive temperature coefficient (PTC) ceramic heating elements 207 and 205. Alternatively, fuel may be heated using negative temperature coefficient (NTC) heating elements if desired. The heated fuel exits the fuel injector when the armature 209 is attracted to coil 203.

Current flows to the injector from electrical connector 210 via two electrical connector pins 211, one of which is shown. Heating elements 205 and 207 along with actuator coil 203 are electrically connected to pins 211. Diodes 233 and 231 (or similar current direction controlling devices) are inserted in the electrical path between electrical connector 210 and devices 203, 207, and 205. Diodes 233 and 231 substantially limit the direction of current through coil 203 and heating elements 207 and 205. That is, the diodes permit substantially full current flow (i.e., current flow is only reduced by a small voltage drop across the diode) in one direction and limit current flow in the opposite direction to a few milliamps. A few circuit examples are illustrated in FIGS. 3 and 4.

Figure 3:
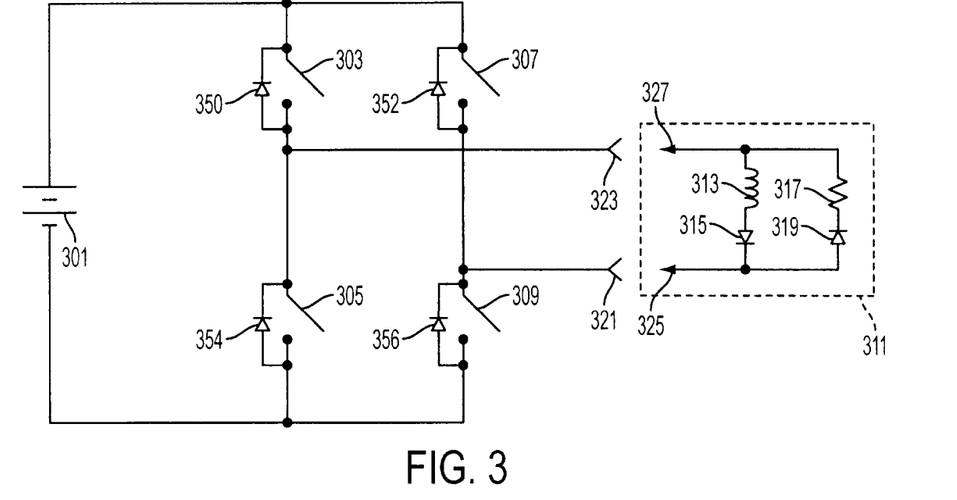
FIG. 3 is a schematic diagram of an example injector fuel heating circuit.
Figure 4:
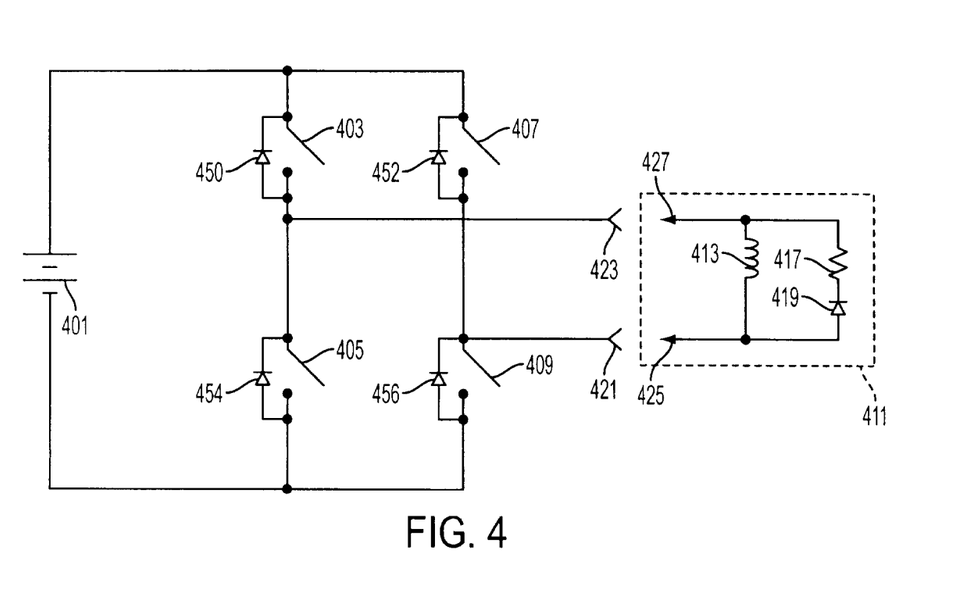
FIG. 4 is a schematic diagram of another example injector fuel heating circuit.

Referring now to FIG. 3, an example circuit for bi-directionally controlling current to a fuel injector and heater is shown. Power supply 301 provides current to actuate and heat fuel injector components identified by region boundary 311. The direction of current supplied to fuel injector 311 is determined by the state of switches 303, 307, 305, and 309. Current flow can be initiated in a first direction by closing switches 307 and 305. Current flow in a second direction can be initiated by closing switches 303 and 309. Switches may be of solid-state (e.g., transistors) or mechanical construction (e.g., relays). Diodes 350, 352, 354, and 356 are included to dissipate inductive energy when switches 303, 307, 305, and 309 are operated.

Current flows through the fuel injector via pins 323 and 321. Note that a unique feature over this design is the reduction in pin count over other fuel heating injector designs. In this example, pins 323 and 321 provide power to actuator coil 313 and heater element 317. Operation of coil 313 and heater element 317 is determined by the direction of current flow because diodes 315 and 319 are biased in different directions.

If current flows into fuel injector pin 327 from wiring harness pin 323, and out of fuel injector pin 325 and wiring harness pin 321, then coil 313 can operate because diode 315 is forward biased. In these conditions diode 319 is reverse biased and substantially stops current flowing to heater element 317.

If on the other hand current flows from fuel injector pin 325 to fuel injector pin 327, heating element 317 can heat fuel because diode 319 is forward biased. Under this condition diode 315 is reverse biased and substantially limits current flow to actuator coil 313.

Thus, the circuit illustrated in FIG. 3 provides two separate functions (actuating a fuel injector and heating fuel in the fuel injector via heating elements) by way of a single electrical connector and a single pair of electrical terminals. By simply changing current direction, the fuel injector function is completely changed. Further, the functions are virtually decoupled from each other. That is, the illustrated circuit allows the fuel injector to be actuated and inject fuel to a cylinder without substantially heating fuel in the injector (when current flows to coil 313 only a small amount of current dependant on the diode design passes diode 319 (e.g., a few milliamps) reaches heating element 317). Consequently, the present description provides for a fuel injector that functions to inject fuel to a cylinder and heat fuel in the injector by way of a heating element that is distinct and separate from the actuator coil.

In addition, the illustrated circuit permits various levels of current to be applied to the coil or heater without causing a device to inadvertently operate. For example, 1 amp or 4 amps can be applied to the heater without causing the coil to actuate the fuel injector. This allows coil or heater operation to be adjusted based on engine operating conditions if desired.

Referring now to FIG. 4, an alternative circuit for controlling current to a fuel injector and heater is shown. Power supply 401, switches 403, 407, 405, and 409 are used in the manner described in FIG. 3 to control the direction of current flow into the fuel injector components identified by boundary 411. Likewise similar to FIG. 3, diodes 450, 452, 454, and 456 are included to dissipate inductive energy when switches 403, 407, 405, and 409 are operated.

If current flows into fuel injector pin 427 from wiring harness pin 423, and out of fuel injector pin 425 and wiring harness pin 421, then coil 413 can operate because no diode blocks the current flow. In these conditions diode 419 is reverse biased and substantially stops current flowing to heater element 317.

If on the other hand current flows from fuel injector pin 425 to fuel injector pin 427, heating element 417 can heat fuel because diode 419 is forward biased. In one embodiment during these conditions, current flowing into the injector can be kept below a predetermined level at which the fuel injector actuates and injects fuel. This allows the heater to operate without actuating the fuel injector. Alternatively, if desired, current can be increased to a predetermined level at which the fuel injector is actuated and heater temperature increases.

Thus, this circuit configuration allows the fuel injector to be operated independent of heater operation, or alternatively, it allows the heater to be operated while the injector is actuated. Further, when the level of current is controlled, this circuit permits the fuel injector to heat fuel in the fuel injector without actuating the fuel injector.

Figure 5:
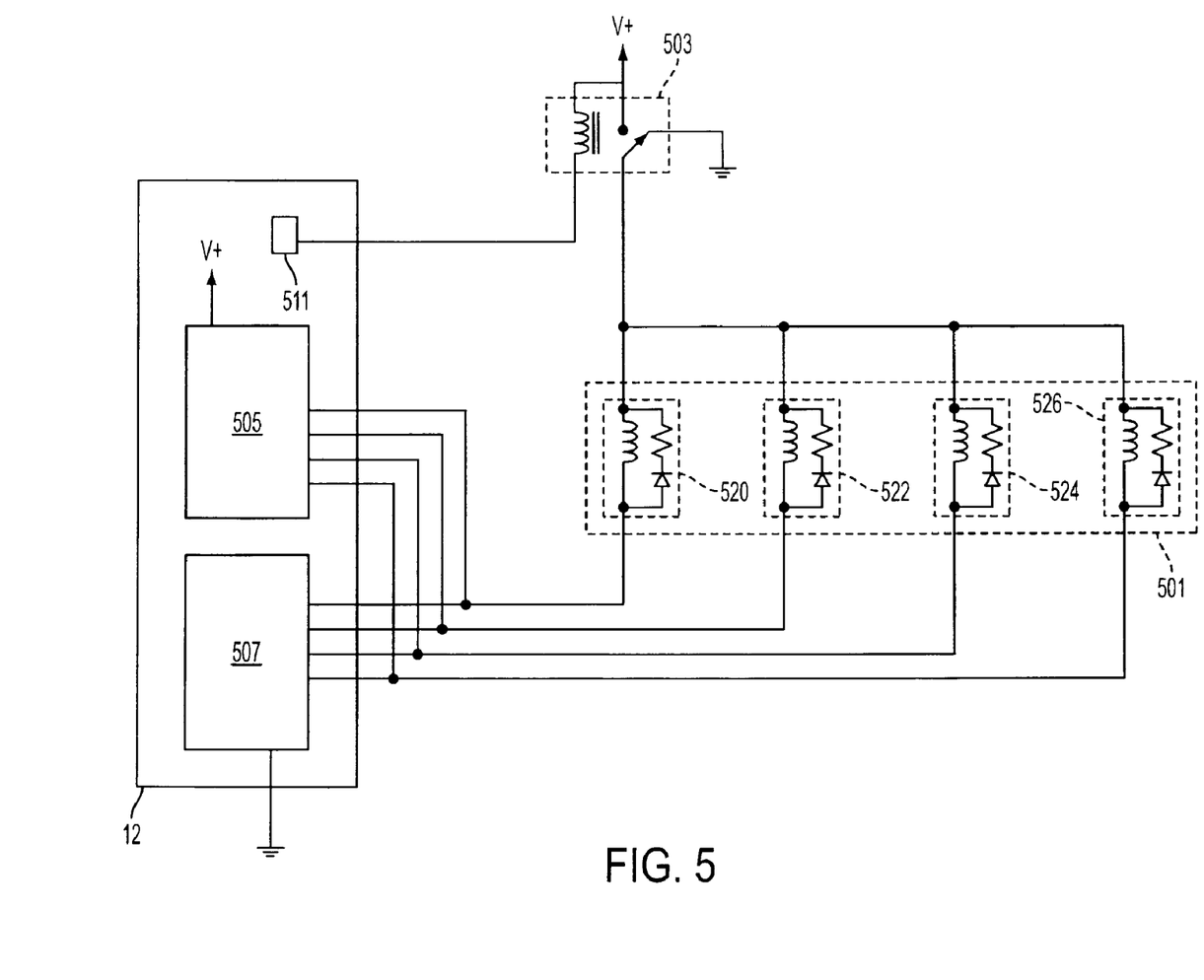
FIG. 5 is a schematic diagram of another example injector fuel heating circuit.

Referring now to FIG. 5, an example of a fuel heating circuitry integrated into an engine controller is illustrated. Engine controller 12 is comprised of a bank of high-side drivers 505, low-side drivers 507, and a relay control switch (e.g., a transistor) 511. External relay 503 is toggled between a first (lower potential) and second (higher potential) voltage depending on the state of relay control switch 511. Alternatively, the external relay 503 may be substituted with solid-state circuitry, if desired.

Circuitry of four heated fuel injectors is within boundary region 501. This injector circuitry represents an example of circuitry for heating fuel for a four cylinder engine. Cylinder number one fuel injector circuitry is within boundary region 520, while fuel injectors for cylinders two through four are shown in boundary regions 522, 524, and 526 respectively.

Relay 503 is shown connecting fuel injectors 520, 522, 524, and 526 to a first voltage reference. Relay 503 may also connect the same fuel injectors to a second voltage reference V+. The second voltage reference is at a higher potential than the first voltage reference. The operating state of switch 511 determines whether relay 503 connects fuel injectors 520, 522, 524, and 526 to the first or second voltage reference.

High-side driver 505 is comprised of individual solid-state switches that are connected to the second voltage reference on one side of the switches and to fuel injectors 520, 522, 524, and 526 on the other side of the switches.

Low-side driver 507 is also comprised of individual solid-state switches that are connected to the first voltage reference on one side of the switches and to fuel injectors 520, 522, 524, and 526 on the other side of the switch.

Fuel is heated in the injector by controlling relay control switch 511 and high-side driver 505. Specifically, relay control switch 511 is set to a state whereby control relay 503 connects the first voltage reference to a terminal of fuel injectors 520, 522, 524, and 526. In addition, switches internal to high-side injector 505 are closed such that the second voltage reference is routed to a second terminal of fuel injectors 520, 522, 524, and 526. Current then flows from the second voltage reference to the first voltage reference in a direction that forward biases a diode in an electrical path going to the heating element of each fuel injector.

On the other hand, the fuel injector is actuated by controlling relay control switch 511 and low-side driver 507. Specifically, relay control switch 511 is set to a state whereby control relay 503 connects the second voltage reference to a terminal of fuel injectors 520, 522, 524, and 526. And, switches internal to low-side injector 507 are closed such that the second voltage reference is routed to a second terminal of fuel injectors 520, 522, 524, and 526. Current then flows from the second voltage reference to the first voltage reference in a direction that reverse biases a diode in an electrical path going to the heating element of each fuel injector. In this way, current is allowed to flow through the injector actuator coils but is limited or blocked from passing through the injector heating element. Thus, current can be driven in one direction to actuated the fuel injector and in a different direction to heat fuel in the injector.

It should be noted that when current is driven in a direction that forward biases the diodes illustrated in FIG. 5, the level of current can be restricted or regulated by high-side driver 505 such that the fuel injector is not actuated.

Figure 6:
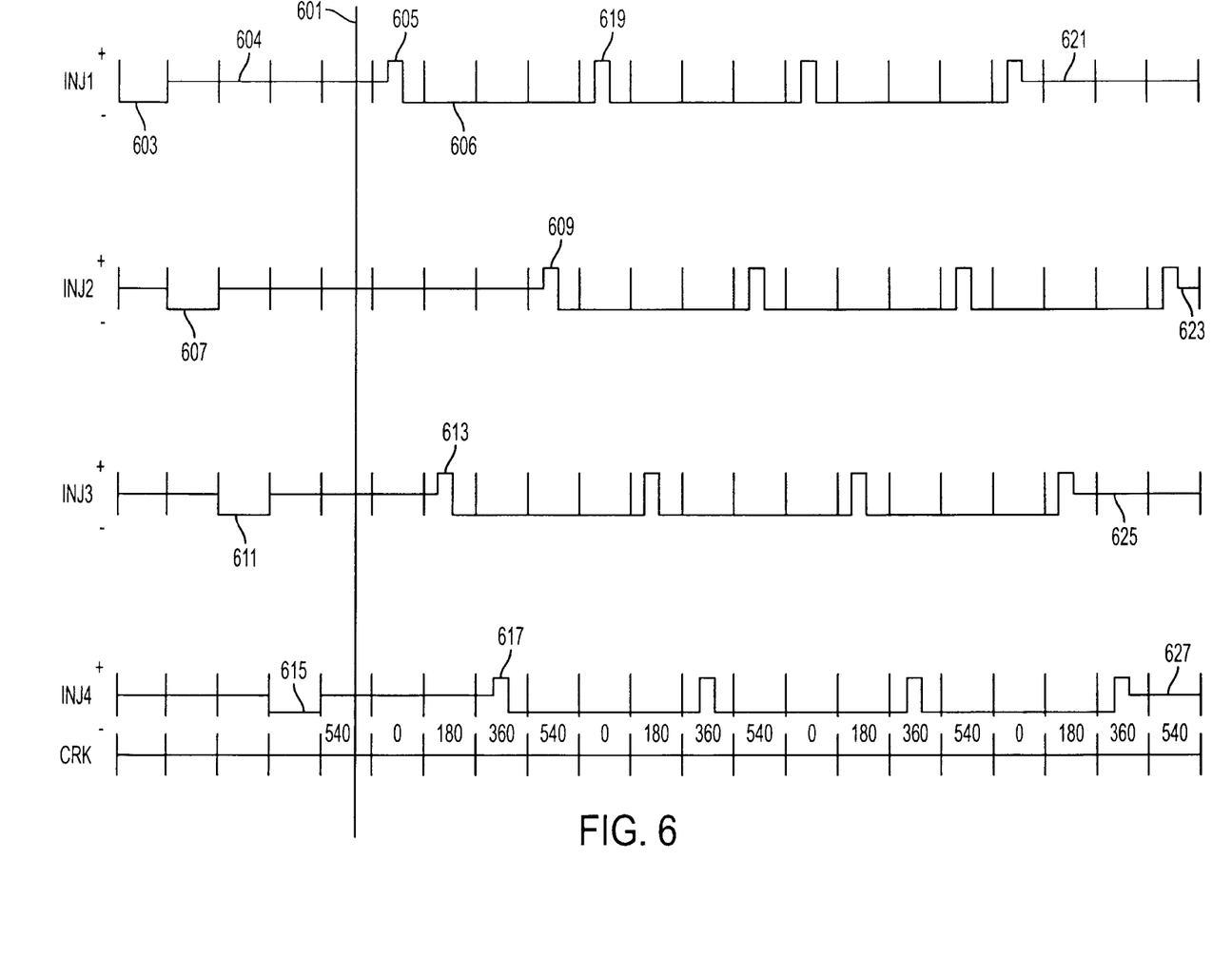
FIG. 6 is a plot illustrating current control for fuel injector fuel heating.

FIG. 6 is plot of example current supplied to fuel injectors of a four-cylinder engine. Signals INJ1-4 represent current delivered to fuel injectors. The "+" represents current being driven into a fuel injector in a second direction. The "−" represents current being driven into the fuel injector in a first direction, opposite the second direction. The location that is approximately half way between the "+" and "−" represents substantially no current flowing into the fuel injector.

Engine position relative to top-dead-center compression stroke of cylinder number one is represented by the signal labeled CRK. Engine cranking and starting begins at vertical marker 601 and the sequence flows from left to right.

Note that the current illustrated in FIG. 6 is not necessarily indicative of the actual current profile. Current is illustrated in FIG. 6 to show an example of when fuel heating may be accomplished relative to fuel injector actuation, the illustration is not meant to illustrate an actual current profile. Also note that fuel heating time may vary from that illustrated without deviating from the scope or breadth of the description. For example, the injector opening timing illustrated at 605 may be increased or decreased or changed with respect to engine position. Further, the amount of current used to open the fuel injector may be increase above the amount of current necessary to open the fuel injector. The resulting additional current can be transformed into heat to further heat the fuel within the injector. Likewise, fuel heating intervals may also vary from those illustrated. For example, between injections at 605 and 619 the heater is shown as being on for the entire interval. However, if desired, the fuel heating may take place for only a fraction of the interval. Furthermore, only a few engine cycles are shown whereas fuel heating may go on for a predetermined period of time or for a specific number of cylinder cycles that exceeds the number illustrated.

Also note that the present method is capable of heating fuel over the engine operating range if desired. For example, fuel heating can be used during a start as well as during engine operation. Heating fuel during engine operation allows the present method to control the cylinder charge temperature.

At 603, current is directed into fuel injector number one in the first direction. This begins heating fuel in the fuel injector. Current flow ceases briefly in region 604. As the engine begins to rotate, right of vertical marker 601, the first injector actuation command is issued at 605. This command directs current into the fuel injector in a second direction. Fuel heating resumes in region 606 when current to fuel injector number one is resumed in the first direction. Fuel is injected to cylinder number one again when current is reversed and sent into fuel injector number one at 619. The described sequence for heating and injecting fuel at fuel injector number one continues until heating is stopped in region 621.

Fuel injector number two follows a similar sequence as fuel injector number one, but fuel heating begins at region 607, the first injection occurs at 609 and fuel heating is stopped at 623. The initial fuel heating at 607 is offset in time from the fuel heating in injector one at 603. This reduces the instantaneous current draw from the vehicle power source before the engine is started. If the vehicle power source has sufficient capacity, fuel in all fuel injectors may be simultaneously heated. In still another embodiment, fuel may be heated at different times in selected groups of fuel injectors. Current at 611 and 615 represents initial fuel heating for cylinders three and four. Fuel injector current at 613 and 617 represents initial actuation current. Fuel injector current at 625 and 627 is substantially zero between injector openings because cylinder temperature has increased to a level that promotes fuel vaporization.

Figure 7:
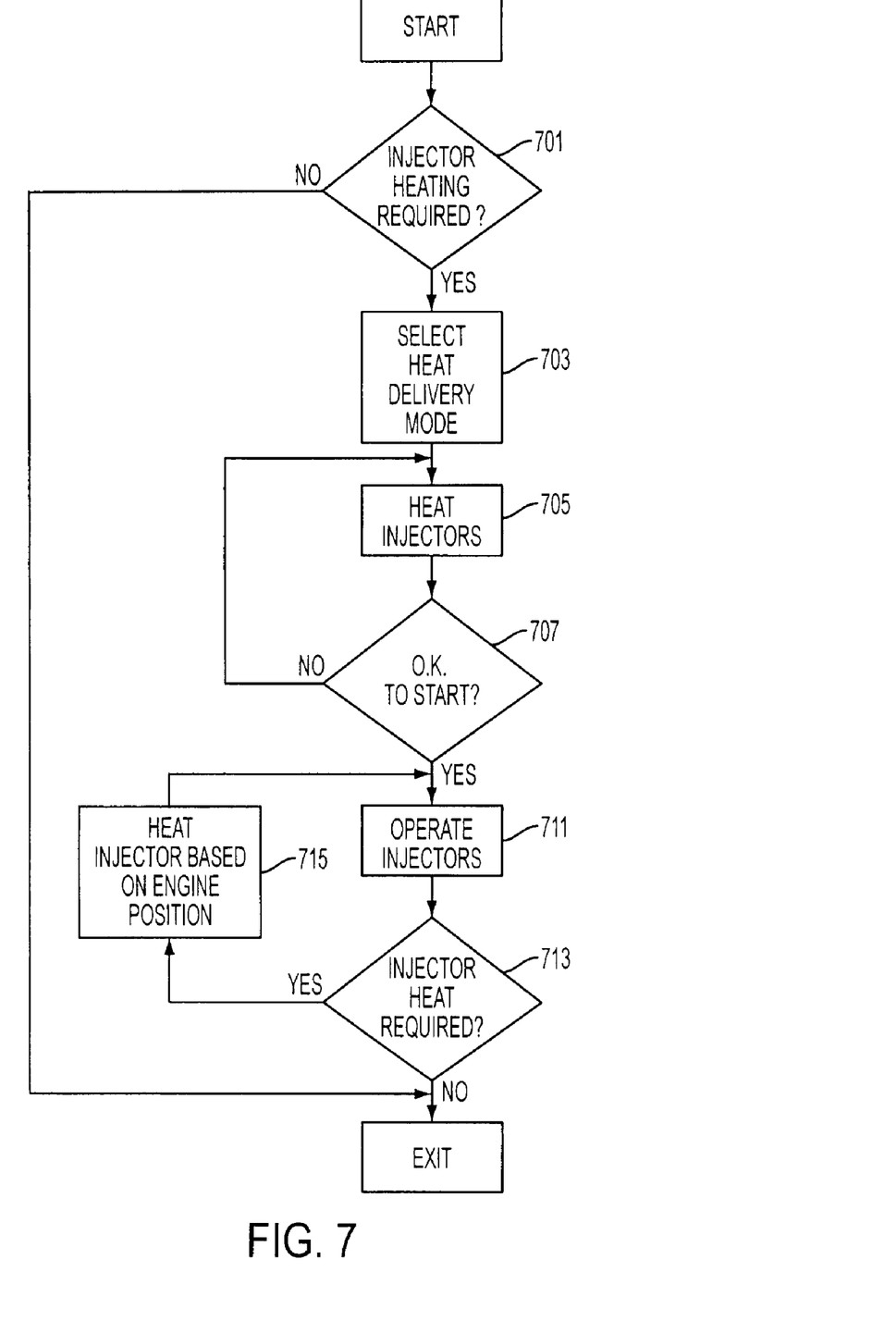
FIG. 7 is a flow chart of an example fuel heating method.

Referring now to FIG. 7, a flow chart of an example fuel injector heating method is shown.

Note that in at least one embodiment, current to actuate a fuel injector (actuation current) enters the fuel injector through an electrical connector having two pins and is delivered in a second direction. Current to heat fuel flowing through the fuel injector is delivered through the same electrical connector and pins but in a first direction, opposite to the second direction described to actuate the fuel injector.

In step 701, the routine determines if fuel heating has been requested. A request for fuel heating may come from an external routine or it may result from evaluating the state of sensors and systems. In one example, the states of engine temperature, time since last engine start, oil temperature, desired cylinder charge temperature, and fuel temperature are used to determine if fuel heating is desired. Further, operating conditions can be used to determine the duration of fuel heating. In one example, the fuel heating duration may be determined by retrieving empirically determined heating times from memory. Specific memory locations may be interrogated by indexing arrays that are organized by engine coolant temperature and engine oil temperature, for example.

In step 703, the fuel injector heating delivery mode is selected. The heating mode describes how and when the fuel heating is delivered to one or more fuel injectors. For example, during an engine start, heat may be delivered to fuel through a group of injectors in a sequential manner and the amount of heat delivered by each injector can be varied in response to operating conditions.

In one embodiment, fuel heat delivery mode can be split into two regions. Specifically, the time before the engine is started and the time after the engine is started. Heat may be delivered to the fuel through a fuel injector before a start in a way that may be different from the way that heat is added to fuel after a start. For example, before the engine begins to rotate the heating sequence may be based on time. That is, current can be sent to heat a different individual injector every 2 seconds, for example. After the engine is started, heat may be delivered at predetermined crankshaft intervals for a predetermined time or crankshaft angle.

Fuel heating by the fuel injector may be delivered to the injectors simultaneously; to groups of injectors where the injectors of a group are simultaneously heated, and where the injector groups are heated at different times; sequentially to all or a group of injectors; or in combinations of the before-mentioned ways. In one embodiment, current is supplied to two or more fuel injectors simultaneously. That is, current for injector heating the injectors is delivered at substantially the same time. Alternatively, it is also possible to deliver current to heat the injectors sequentially. For example, current for injector heating can be supplied to a first injector, stopped, supplied to a second injector, stopped, and continued in the same manner to the remaining injectors.

In addition, this sequence may be repeated until operating conditions, such as time since key-on has reached a predetermined level or until engine oil temperature reaches a desired level, for example. As mentioned above, after the engine is started, the fuel injector heating may be continued or may be stopped. Further, the amount of heat transferred when the engine is stopped may be different from the amount of heat delivered after the engine is started.

Engine operating conditions (e.g., engine temperature, fuel temperature, cylinder charge temperature, barometric pressure) may be used to determine when to deactivate injector heating. In addition, the fuel heating mode and the timing when heat is delivered to the fuel may also be varied as the engine begins to rotate.

FIG. 6 shows one example of a fuel injector heating delivery mode that is available from the present description. Specifically, injector heating is delivered at predetermined crankshaft intervals so that the heating does not interfere with injector operation. Further, it is also possible to briefly deactivate heating to one injector if current is needed to actuate another fuel injector during the same crankshaft interval. For example, if fuel injector heating is scheduled for cylinder number four fuel injector between 540 and 0 crankshaft degrees referenced to top-dead-center of cylinder one, and fuel injection is scheduled for cylinder number one during this same interval, then the heating for cylinder four fuel injector may be deactivated while injection commands are issued to the cylinder number one fuel injector.

Continuing with step 703, the heating mode may be determined by assessing engine operating conditions, injector operating conditions including barometric pressure, humidity, cylinder charge temperature, and engine temperature. In one embodiment, the operating conditions may be used to exercise a state machine that can activate different heat delivery modes before and after starting. The selection of these heat delivery modes may be empirically determined, for example. FIG. 6 provides a sample of the available heating modes that may be selected. The routine proceeds to step 705 after the heat delivery mode is selected.

Referring now to step 705, the fuel is heated in the injectors. In one embodiment, the fuel heating duration may be reduced or increased based on the type of fuel being heated. Specifically, in one example, a sensor can determine the concentration ethanol in a fuel line leading to the fuel injector. The fuel heating time can be varied as the concentration of ethanol increases in the fuel line. In addition, the rate that heat is delivered to the fuel can be varied as the fuel type varies (e.g., as the concentration of ethanol varies) by varying the amount of current supplied to the heating element. Further, the rate heat is transferred and/or the duration of fuel heating can be varied as the engine's or vehicle's altitude varies. Further still, the rate heat is transferred and/or the duration of fuel heating can be varied as the ambient air humidity varies and/or as engine temperature varies.

In one embodiment, the heating duration and heat transfer rate are empirically determined and stored in engine controller memory for later retrieval and use. In one embodiment, the amount of fuel heating is reduced as barometric pressure is reduced (i.e., altitude increases).

As noted above, the present method can also adjust fuel temperature to affect the cylinder charge temperature. In one embodiment, desired cylinder charge temperature is mapped over the engine operating ranges for a particular type of fuel (e.g., ethanol). A model infers cylinder charge temperature from intake air temperature, engine temperature, engine speed, cylinder air charge amount, fuel type, and injection timing. If the inferred cylinder charge temperature deviates from the desired cylinder charge temperature, then heat can be added to the fuel (i.e., the rate of heat addition and/or the amount of time heat is delivered to fuel) or the heater can be deactivated so that the desired temperature is reached.

Thus, the present method is capable of adjusting the rate of heat transfer from a fuel injector to fuel, as well as the fuel heating duration in response to environmental and vehicle operating conditions.

In one example, the amount of heat transferred over a period of time to the fuel delivered to the engine after the engine is started may be increased as compared to the amount of heat delivered to fuel before the engine is started. The present method also allows different heat transfer rates to the fuel depending on the power source. When the power to heat fuel comes from a battery, current may be a first amount. When power to heat fuel comes from an alternator, current may be a second amount, different from the first amount.

As previously mentioned, the fuel may be heated by PTC or NTC devices. Further, the actuator coil may be used to heat the fuel as well. The PTC/NTC heating elements may transfer heat directly to fuel or they may transfer heat to fuel through an intermediate material by conduction. Similarly, the actuator coil may transfer heat to fuel by using the internal resistance of the fuel injector coil to heat the injector components that surround the coil. The coil heat can be transferred to the surrounding material through conduction. The coil resistance transforms the electrical energy entering the coil into thermal energy. By applying a controlled current to the fuel injector coil, the temperature of the injector coil may be regulated so that the coil transfers a desired amount of thermal energy to the surrounding injector while maintaining the temperature of the coil below a predetermined level. In one example, current supplied to the coil is regulated below a predetermined amount so that there is insufficient current to operate the injector, but enough to heat fuel within the injector.

In addition, eddy current heating may also be used to heat fuel by generating a time-varying magnetic field from varying the current that flows into the actuator coil. The current may be varied in a variety of ways. For example, the current entering the coil may be increased and decreased over a specified time interval, or if the engine is rotating, the current may be increased or decreased over a specified crankshaft interval (e.g., The excitation frequency may be adjusted by a predetermined amount every 3600 crankshaft angle degrees. As the current varies, a magnetic field external to the coil varies and ferrous material in the field resists the changing magnetic field, thereby heating the ferrous material. Heat is conducted from the ferrous material to the fuel.

The current flow to the fuel injector may be controlled by an H bridge that allows bi-directional current flow, or by other circuitry that provides a similar function.

Also note that the fuel injection timing may be adjusted as a function of the time fuel injectors are heated or as the amount of heating energy supplied to a fuel injector varies. For example, at a constant engine speed and load, the fuel injection pulse-width may be decreased as the amount of heat energy supplied to a fuel injector increases. This feature allows an engine controller to compensate for the improved response of a heated injector. After the coils start to heat, the routine proceeds to step 707.

In step 707, the routine determines whether or not the engine is ready to start after fuel heating has commenced. In one embodiment, if the fuel has reached a desired temperature or a time since key-on, the engine controller 12 can notify the operator that the engine is ready to start or the engine may be started in other circumstances. In other embodiments, the engine may be considered ready to start after a desired amount of heating energy has been supplied to fuel in one or more injectors. For example, the engine may be considered ready to start if a predetermined number of joules of energy have been dissipated by each fuel injector heating element. Also note that in some embodiments, the engine may be allowed to start as soon as instructed by an operator. That is, fuel heating may be initiated but the engine may be started whether or not fuel has reached a desired temperature. If this mode of operation is selected, the fuel pulse-width may be adjusted to improve starting. If the routine determines that the engine is ready to start the routine proceeds to step 711. Otherwise, the routine returns to step 705.

In step 711, the injectors are controlled so that the desired amount of fuel is injected to the cylinders at the desired timing. That is, current is delivered in a second direction such that it flows through the actuator coil substantially unencumbered (e.g., a small reduction in current caused by a voltage drop across a diode or similar device is anticipated and permissible). When current is directed in this manner, the fuel injectors are operated in a way that is similar to conditions when injector heating is not desired. That is, current is supplied to the injector at a crankshaft angle and desired duration that delivers the desired amount of fuel to the cylinder.

In step 713, the routine determines if fuel heating is desired while the engine is operating. If it is, the routine proceeds to step 715. If not, the routine proceeds to exit. If no fuel heating is desired during engine operation, current flow is limited to the second direction, and the injectors are operated by the main fuel injection routine and fuel is delivered in response the engine speed, operator demand, and operating conditions.

In step 715, the fuel is heated by applying current to the fuel injector in a first direction while the injector is not actuated. That is, as described above, when current flows to the fuel injector in a second direction the injector is actuated. Current flows to the fuel injector in a first direction, different from the second direction, to heat fuel passing through the injector. Accordingly, current is repeatedly reversed as the engine operates. For example, current flows into the coil when it is delivered to the injector in a second direction. When the injector has delivered the desired amount of fuel, the current is reversed and delivered in a first direction to heat fuel passing through the injector. The heating current may be delivered to the fuel injector for the entire period between fuel injections, or it may be delivered for a fraction of the period between injections.

The rate of heat delivery to the fuel and the duration heat is transferred to the fuel can be an open-loop or closed-loop control process. In one embodiment, fuel heating rate and duration are determined after assessing engine temperature, barometric pressure, and humidity. In this example, fuel heating follows a prescribed schedule that has been programmed into the engine controller.

In a closed-loop embodiment, engine sensors are repeatedly monitored and used to determine operating conditions so that the heat transfer rate and duration of fuel heating can be revised as engine operating conditions vary. Specifically, the following calculations are one example method to determine the heat transfer rate.

$$\text{HeatCur} = \text{Basecur}(N) \cdot \text{cur}h(\text{hum}) \cdot \text{cur}f\text{tem}(\text{fueltemp}) \cdot \text{curetem}(\text{engtemp}) \cdot \text{cur}f\text{typ}(\text{ftype}) \cdot \text{curbar}(\text{baro})$$

Where HeatCur is the amount of current to deliver in a heating interval, where Basecur is an empirically determined base amount of current that is a function of engine speed N, where curh is a modifier that is a function of humidity hum, where curftem is a modifier that is a function of fuel temperature fueltemp, where curetemp is a modifier that is a function of engine temperature engtemp, where curftype is a modifier that is a function of fuel type ftype, and where curbar is a modifier that is a function of barometric pressure baro.

The fuel heating duration can be determined from a similar function.

$$\text{DurCur} = \text{Basedur} \cdot \text{dur}h(\text{hum}) \cdot \text{dur}f\text{tem}(\text{fueltemp}) \cdot \text{duretem}(\text{engtemp}) \cdot \text{dur}f\text{typ}(\text{ftype}) \cdot \text{durbar}(\text{baro})$$

Where DurCur is the duration current is delivered, where Basedur is an empirically determined base duration of current, where durh is a modifier that is a function of humidity hum, where durftem is a modifier that is a function of fuel temperature fueltemp, where duretemp is a modifier that is a function of engine temperature engtemp, where durftype is a modifier that is a function of fuel type ftype, and where durbar is a modifier that is a function of barometric pressure baro.

Note as mentioned above, current control can vary depending on the circuitry within the fuel injector. For example, if current is impeded in one direction through the PTC/NTC heating element, and current is not impeded through the actuator coil, it may be desirable to limit current flow to the entire fuel injector (actuator coil and heating element) so that the fuel injector does not actuate when fuel is being heated. On the other hand, if current flow can be impeded through both the actuator coil and the heating element, heating current may not have to be limited to as low of a level as if current where flowing through both the actuator coil and the heating element.

While the engine is being operated, it is desirable to keep the fuel injectors delivering a commanded amount of fuel. This can be accomplished by heating the injector during the portion of a cylinder cycle where fuel is not injected. For example, the fuel injectors may be heated during the power or exhaust strokes. FIG. 6 shows an example of heating the fuel injectors while the engine is operating. Of course, the fuel injector heating interval may be varied from that which is shown in FIG. 6, if desired. One convenient way to achieve heating during engine operating is to time the heating period with engine positions. That is, the heating interval can be between bottom-dead-center of the exhaust stroke and top-dead-center of the exhaust stroke of the cylinder associated with the injector being heated, for example. After the coil current sequences are determined and commanded the routine returns to step 711.

This concludes the description. The reading of it by those skilled in the art would bring to mind many alterations and modifications without departing from the spirit and the scope of the description. For example, I3, I4, I5, V6, V8, V10, V12, and turbine engines operating on non-limiting fuel types such as ethanol, kerosene, jet fuel, gasoline, propane, proponol, diesel, or other alternative fuel configurations could use the present description to advantage.

The invention claimed is:

1. A fuel injector for heating and injecting fuel into an internal combustion engine, said fuel injector comprising:
   an element to control flow of fuel through said fuel injector;
   a heating element to heat fuel passing through said fuel injector, said heating element separate from said element that controls fuel flow through said fuel injector; and
   a circuit comprising said heating element and said element that controls fuel flow through said fuel injector, said circuit heating fuel passing through said fuel injector without actuating said fuel injector when current flows in a first direction and is below a predetermined level, said circuit heating fuel passing through said fuel injector and actuating said fuel injector when current flows in said first direction and is above said predetermined level, and said circuit actuating said fuel injector without substantially heating said fuel injector when current flows to said fuel injector in a second direction, said second direction different from said first direction, wherein said actuating of said fuel injector delivers fuel from the fuel injector.

2. The fuel injector of claim 1 wherein said element to control fuel flow is a coil or a piezoelectric device.

3. The fuel injector of claim 1 wherein said fuel injector has an electrical connector with two pins. has two pins.

4. The fuel injector of claim 2 wherein said coil is used to move a spool valve or an injector armature pintle, and wherein there is a current flow control device in series with said heating element and wherein there is no current flow control device in series with said element to control flow of fuel through said fuel injector.

5. The fuel injector of claim 1 wherein said fuel injector is designed to inject fuel directly into a cylinder.

6. The fuel injector of claim 1 wherein said fuel injector is designed to inject fuel into an intake port leading to a cylinder.

7. The fuel injector of claim 1 wherein said fuel injector is designed to inject a fuel comprising at least one of: gasoline, propane, ethanol, diesel, bio-diesel, butenol, proponol, kerosene, or jet fuel.

8. The fuel injector of claim 1 wherein said fuel injector accepts current from a single bi-directional current source.

9. The fuel injector of claim 1 wherein said circuit is further comprised of one or more devices that limit flow of said current depending on the direction of said current.

10. The fuel injector of claim 9 wherein said device that limits flow of current is a diode.

11. A method to operate a fuel injector, the method comprising:
   supplying a first current in a first direction to heat fuel passing through said fuel injector without actuating said fuel injector when said first current is below a predetermined level, said first current heating fuel passing through said fuel injector and actuating said fuel injector when said current is above a predetermined level, said first current delivered at predetermined crankshaft intervals; and
   supplying a second current in a second direction, said second direction different from said first direction, to actuate said fuel injector without substantially heating said injector, fuel flowing through said fuel injector while current is supplied in said second direction.

12. The method of claim 11 wherein said first current and said second current are supplied from a common source.

13. The method of claim 12 wherein said first current and said second current are routed through a pair of wires.

14. The method of claim 11 wherein said first current is supplied in said first direction for a predetermined period of time when an engine that said fuel injector is injecting fuel to is started.

15. The method of claim 11 wherein said first current is supplied by an H-bridge circuit.

16. The method of claim 11 wherein said second current is supplied in said second direction in excess of an amount necessary to permit fuel flow through said fuel injector.

17. The method of claim 11 wherein said first current is supplied in said first direction when an engine is not rotating, and wherein said current is supplied in said second direction when said engine is rotating.

18. A system for heating fuel supplied to an engine, comprising:

a plurality of fuel injectors, each fuel injector of said plurality of fuel injectors comprising a flow control element, a heating element separate from said flow control element, and a circuit comprising said heating element and said element that controls fuel without actuating said fuel injector when current is in a first direction and below a predetermined level, said circuit heating fuel passing through said fuel injector and actuating said furl injector when current is in said first direction and above said predetermined level, and said circuit actuating said fuel injector without substantially heating said fuel injector when current flows to said fuel injector in a second direction, said second direction different from said first direction, wherein said actuating of said fuel injector delivers fuel from the fuel injector; and a current supply comprised of a single switch that switches, between two current sources, a first terminal of each fuel injector that comprise said plurality of fuel injectors, said current supply also comprised of a plurality or switches configured to switch a second terminal of each of said plurality of fuel injectors between said two current sources.

* * * * *